United States Patent [19]
Takemae et al.

[11] Patent Number: 5,777,801
[45] Date of Patent: Jul. 7, 1998

[54] INTERNAL FOCUSING ZOOM LENS WITH MEANS PREVENTING LENS WARPING EFFECTS

[75] Inventors: Hisao Takemae; Nobuo Matsui, both of Omiya, Japan

[73] Assignee: Fuji Photo Optical Co., Ltd., Omiya, Japan

[21] Appl. No.: 800,194

[22] Filed: Feb. 13, 1997

[30] Foreign Application Priority Data

Feb. 16, 1996 [JP] Japan ................................ 8-029592

[51] Int. Cl.$^6$ ................................................ G02B 15/14
[52] U.S. Cl. .................................... 359/694; 359/703
[58] Field of Search ............................. 359/694, 699, 359/700, 701, 704, 706, 823, 826, 829, 830

[56] References Cited

U.S. PATENT DOCUMENTS

| | | |
|---|---|---|
| 4,357,085 | 11/1982 | Niwa et al. ................ 354/25 |
| 4,472,031 | 9/1984 | Muryoi ........................ 359/701 |
| 4,560,237 | 12/1985 | Ohkura et al. ............... 359/825 |
| 4,731,669 | 3/1988 | Hayashi et al. .............. 358/229 |
| 5,264,966 | 11/1993 | Okada et al. ................. 359/696 |
| 5,335,032 | 8/1994 | Onuki et al. ................. 354/195.1 |
| 5,528,430 | 6/1996 | Hamasaki .................... 359/701 |

*Primary Examiner*—Scott J. Sugarman
*Assistant Examiner*—Ricky Mack
*Attorney, Agent, or Firm*—Sixbey, Friedman, Leedom & Ferguson; David S. Safran

[57] ABSTRACT

A helicoid is formed at the outer periphery of the front of a body fixing lens barrel, and a helicoid is formed at the inner periphery of the back of the focusing lens barrel in such a manner that these two helicoids can be engaged with each other. A movable focusing lens group is held by the front of the focusing lens barrel so that the helicoid can be pushed to one side and the inaccurateness of the focus can be reduced. A lens hood is attached to a fixed focus lens frame fixed to a focus fixing lens barrel, which is different from the body fixing lens barrel. Thereby, even if the focus fixing lens barrel is deformed by the force generated by the attachment, the deformation does not warp the helicoid.

12 Claims, 4 Drawing Sheets

5,777,801

1

INTERNAL FOCUSING ZOOM LENS WITH MEANS PREVENTING LENS WARPING EFFECTS

BACKGROUND OF THE INVENTION

1. Field of the Invention

The present invention relates generally to an internal focusing zoom lens, and more particularly to an internal focusing zoom lens which is applied to a handy camera for business use, and in which a lens hood and a tele-convertor lens or a wide convertor lens are attached to the front end of the taking lens.

2. Description of the Related Art

The conventional zoom lens for a handy camera such as an electronic news gathering (ENG) camera for business use performs the focusing by extending the whole group of the focus lenses. An internal focusing zoom lens is widely used because a square hood or a polarizing filter is easy to use, and the like. FIG. 3 illustrates the structure of the conventional internal focusing zoom lens, and FIG. 4 is an enlarged view of the front end of the conventional internal focusing zoom lens. As depicted in the drawings, the conventional internal focusing zoom lens 70 is constructed in such a manner that a focus fixing lens barrel 72 is attached to the front of a body 24; a fixed focus lens group 12 and a movable focus lens group 14 are held by the focus fixing lens barrel (focus fixing frame) 72; and a first movable lens group 16 and a second movable lens group 18 are held by a zoom cum cylinder 40 of the body 24.

The fixed focus lens group 12 is held by a fixed focus lens frame 74, and it is screwed into the forefront at the inside of the focus fixing lens barrel 72, and fixed there. The focus fixing lens barrel 72 is constructed in such a manner that a female screw hole 72A is formed at the point thereof, and a set screw is screwed into the female screw hole 72A from the outside in the direction of the diameter so that the focus fixing lens barrel 72 can be abutted against the fixed focus lens frame 74. Thereby, the focus fixing lens barrel 72 can be prevented from rotating in the direction of its circumference.

On the other hand, the movable focus lens group 14 is held by a movable focus lens frame (focusing lens barrel) 26, and the focusing lens barrel 26 connects to the focus fixing lens barrel 72 via a helicoid 27. An interlock pin 28 is secured to the focusing lens barrel 26, and a focus ring 30 is engaged with the interlock pin 28 such that the focus ring 30 can be rotated with regard to the focus fixing lens barrel 72.

In the above-mentioned structure, when the focus ring 30 rotates, the focusing lens barrel 26 rotates via the interlock pin 28 which is engaged with the focus ring 30. In this case, the focusing lens barrel 26 moves forward and backward in the direction of the optical axis while rotating via the helicoid 27, which is provided for connecting the focus fixing lens barrel 72 with the focusing lens barrel 26, so that the focusing can be performed.

In most cases, as depicted in the drawing, the lens hood 60 is attached to the front end of the focus fixing lens barrel 72. The lens hood 60 is attached to the focus fixing lens barrel 72 in such a manner that a screw 64 is screwed into the thick portion of a base end 60A from the outside in the direction of the diameter, and the screw 64 presses the outer periphery of the focus fixing lens barrel 72. A tele-convertor lens, a wide convertor lens, and the like are attached to a screw 72B at the inside of the front end of the focus fixing lens barrel 72.

2

The conventional internal focusing zoom lens, however, has such a disadvantage that if the lens hood 60, the wide convertor lens, etc. are attached to the front end of the focus fixing lens barrel 72, the focus fixing lens barrel 72 is deformed, and the helicoid 27 of a mechanism for extending the movable focus lens group 14 is warped. Particularly, the television lens which requires a high accuracy of the lens position has such a disadvantage that the focus cannot be performed well if the helicoid is warped by only several µ meters.

If a space is provided in the helicoid to absorb the warp caused by the attachment of the lens hood 60, the wide convertor lens, etc., the focus is inaccurate, and the focusing cannot be accurately performed.

If the focus fixing lens barrel is so strong that the helicoid is prevented from warping when the lens hood, the wide convertor lens, etc. are attached, there is a problem in that the focus fixing lens barrel is very heavy.

SUMMARY OF THE INVENTION

Accordingly, it is an object of the present invention to provide a high-powered and lightweight internal focusing zoom lens which ensures that focusing can be accurately performed even if a lens hood and a wide convertor lens (or a tele-convertor lens) are attached to the front end of a body of the lens, and which prevents the inaccurateness of the focus.

In order to achieve the above-mentioned object, the invention is directed to an internal focusing zoom lens, which performs focusing by extending, forward and backward, a movable focus lens group provided behind a fixed focus lens group, and which comprises a first fixing lens barrel in which a helicoid is formed to extend the movable focus lens in the direction of the optical axis; a focusing lens barrel supporting the movable focus lens group and connecting to the first fixing lens barrel in such a manner as to move forward and backward; a second fixing lens barrel in which a fixed focus lens frame for supporting the fixed focus lens frame is fixed at a tip thereof; and wherein when at least one of a lens hood, a wide convertor lens or a tele-convertor lens is attached to the second fixing lens barrel, the second fixing lens barrel is warped, but the helicoid of the first fixing lens barrel is not warped.

According to the present invention, the fixing lens barrel (the first fixed lens barrel) provided with the extending mechanism for extending the movable focus lens group in the direction of the optical axis is a different member from the fixed lens barrel (the second fixed lens barrel) for supporting the fixed focus lens group. At least one of the lens hood, the wide convertor lens and the tele-convertor lens is attached to the second fixing lens barrel. Thus, if the second fixing lens barrel is deformed by the force caused by the attachment, the deformation does not warp the extending mechanism of the first fixed lens barrel. Thereby, the extending mechanism can be prevented from warping, and the focusing can be accurately performed.

In order to achieve the above-mentioned object, the invention also is directed to an internal focusing zoom lens, which performs focusing by extending, forward and backward, a movable focus lens group provided behind a fixed focus lens group, and which comprises a first fixing lens barrel in which a helicoid is formed to extend the movable focus lens in the direction of the optical axis; a focusing lens barrel which supports the movable focus lens group, and wherein a helicoid engaged with the helicoid of the first fixing lens barrel, the focusing lens barrel connecting to the first fixing lens barrel in such a manner as to move forward and backward; a second fixing lens barrel in which a fixed focus lens frame for supporting the fixed focus lens frame is fixed at a point thereof; and the internal focusing zoom lens is characterized in that at least one of a lens hood, a wide convertor lens or a tele-convertor lens is attached to the second fixing lens barrel or the fixed focus lens frame fixed to the second fixing lens barrel, the second fixing lens barrel is warped, but the helicoid of the first fixing lens barrel is not warped.

According to the present invention, the fixing lens barrel (the first fixing lens barrel) with the helicoid for extending the movable focus lens group is different from the fixing lens barrel (the second fixed lens barrel) which supports the fixed focus lens frame. At least one of the lens hood, the wide convertor lens, and the tele-convertor lens is attached to the fixed focus lens frame which is fixed to the second fixing lens barrel. Thus, even if the second fixing lens barrel is deformed, the deformation does not effect the helicoid of the first fixing lens barrel, and the helicoid does not warp. Thereby, the helicoid can be prevented from warping, and the focusing can be accurately performed.

In the focusing lens barrel, a center of gravity of the movable focus lens group is positioned away from the helicoid in the direction of the optical axis, so that the helicoid of the focusing lens barrel is pushed toward the helicoid of the first fixing lens barrel by the deadweight of the movable focus lens group so that these two helicoids can contact each other. Thereby, the inaccurateness of the focus can be reduced, and the focusing can be accurately performed.

In order to achieve above-mentioned object, the invention is directed to an internal focusing zoom lens which extends a movable focus lens group provided behind a fixed focus lens group in a direction of an optical axis; a fixing lens barrel provided with an extending means for extending the movable focus lens group in the direction of the optical axis; a focusing lens barrel supporting the movable focus lens group, having an engaged section engaged with the extending means, and connecting to the fixing lens barrel in such a manner as to be move forward and backward, the focusing lens barrel supporting said movable focus lens group so that a center of gravity of the movable focus lens group can be positioned away from the engaged section in a direction of an optical axis; and the extending means is pushed to the engaged section.

According to the present invention, the center of gravity of the movable focus lens group is away from the position where the movable focus lens group is engaged with the extending means. For this reason, the extending means provided in the fixing lens barrel and the engaged section provided in the focusing lens barrel are pushed to one side by the deadweight of the movable focus lens so that they can steadily contact each other. Thereby, the inaccurateness of the focus can be reduced, and the focusing can be accurately performed. The helicoid and a cam are useable for the extending means.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a partially sectional view illustrating the structure of a television lens which the present invention applies to;

DETAILED DESCRIPTION OF THE PREFERRED EMBODIMENTS

Figure 1:
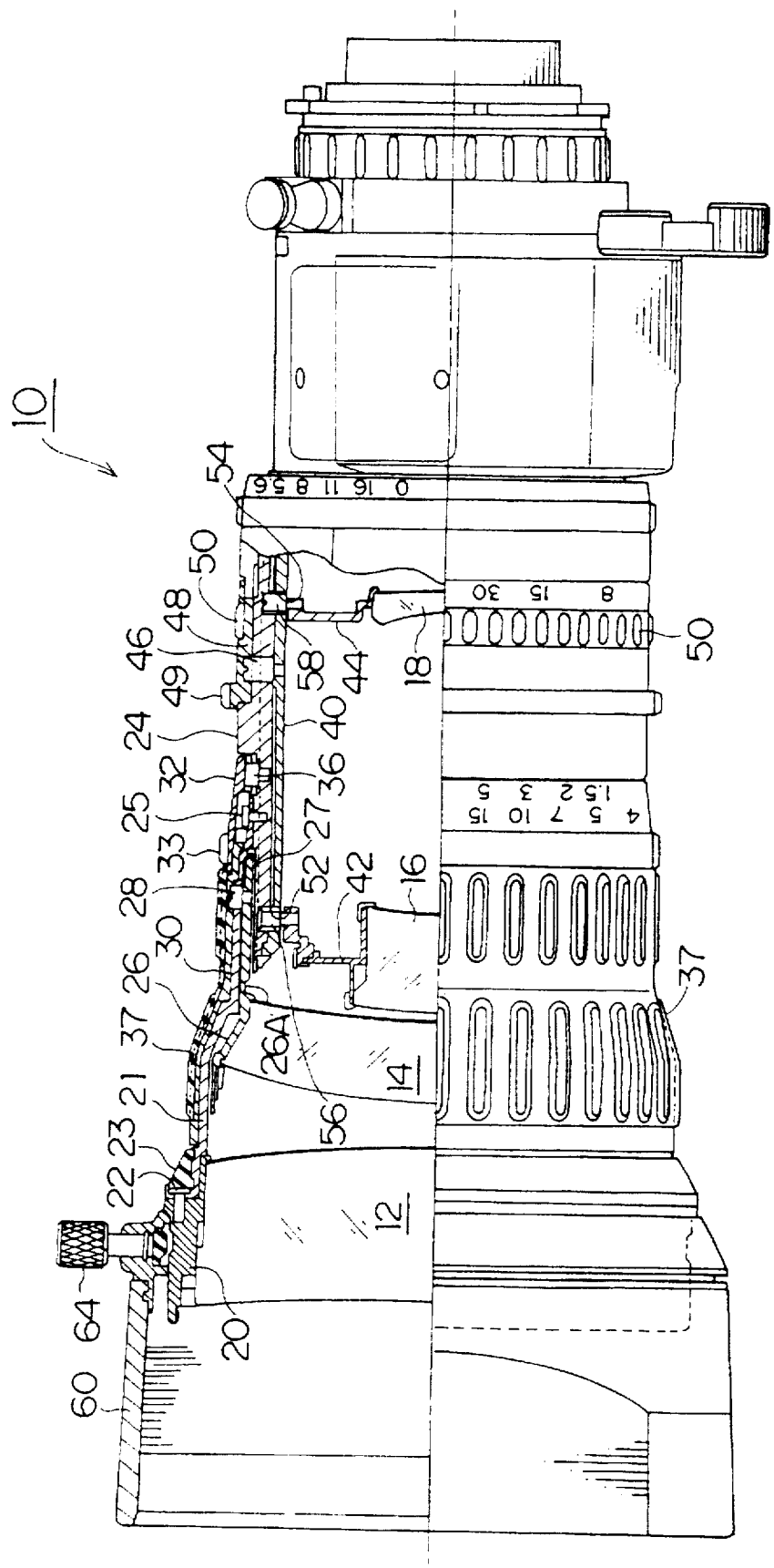
Figure 2:
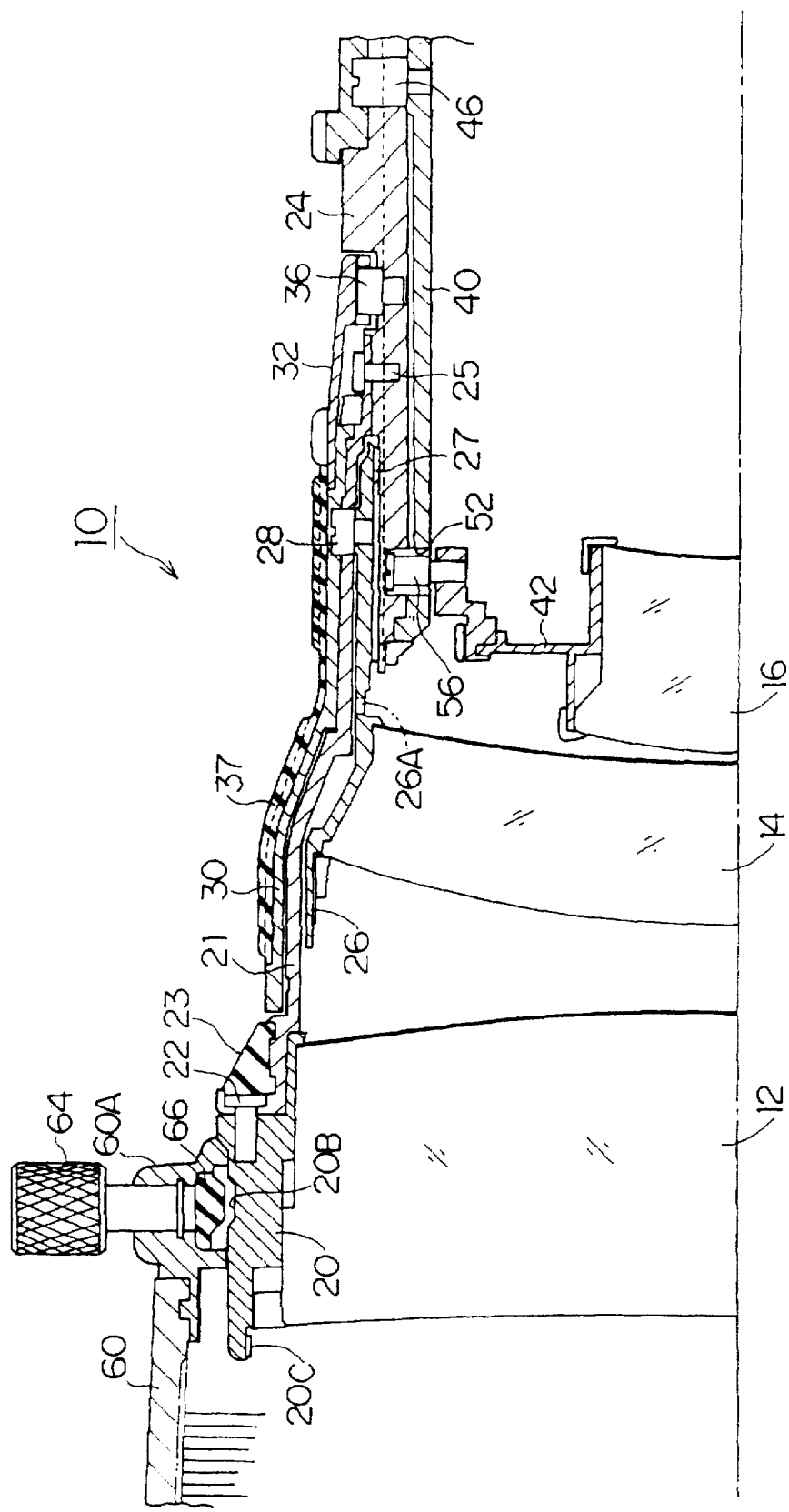
FIG. 2 is an enlarged view illustrating the essential parts of the television lens in FIG. 1.
Figure 3:
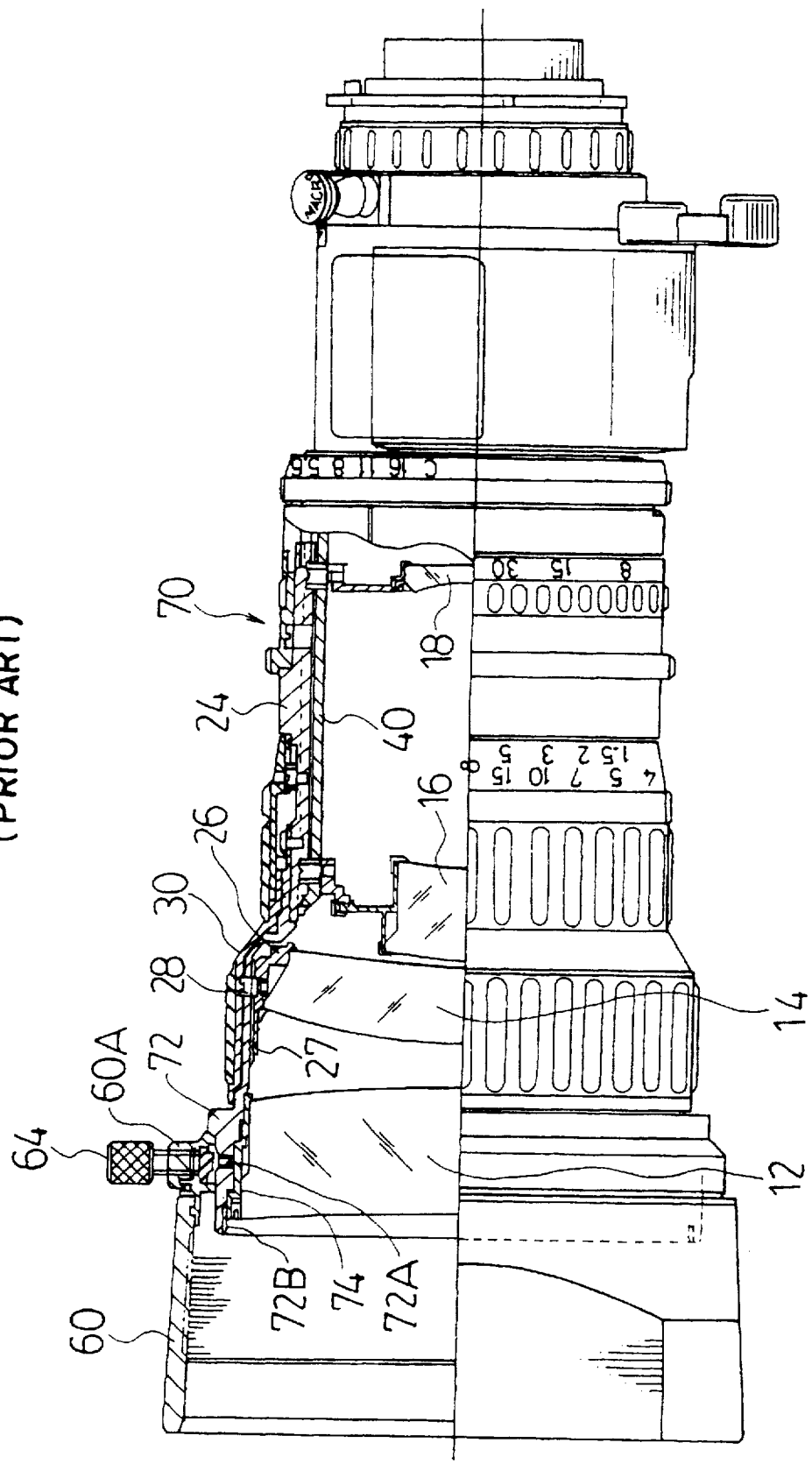
FIG. 3 is a partially sectional view illustrating the structure of the conventional internal focusing lens.

FIG. 1 is a sectional view illustrating the structure of a television lens 10 for the present invention. FIG. 2 is an enlarged view illustrating the essential parts at the front of the television lens 10 in FIG. 1. As shown in the drawings, a fixed focus lens group 12, a movable focus lens group 14, a first movable zoom lens group 16, a second movable zoom lens group 18, an iris and a relay lens (not shown), and so forth. The internal focusing zoom lens is comprised mainly of a focusing section, which consists of the fixed focus lens group 12 and the movable focus lens group 14, and a zooming section, which consists of the first movable zoom lens group 16 and the second movable zoom lens group 18.

The fixed focus lens group 12 is supported by a fixed focus lens frame 20, and it is fixed to the forefront of a focus fixing lens barrel (corresponding to a second fixing lens barrel) 21 via a screw 22. The section where the fixed focus lens group 12 connects to the focus fixing lens barrel 21 via the screw 22 is sealed by a rubber member 23.

The fixed focus lens barrel 21 is engaged with a body fixing lens barrel (corresponding to a first fixing lens barrel) 24, and the rear end of the focus fixing lens barrel 21 is fixed to the body fixing lens barrel 24 via a screw 25.

The movable focus lens group 14 is held at the front of a focusing lens barrel 26, and a helicoid 27 is provided behind the focusing lens barrel 26 to extend the focusing lens barrel 26 forward and backward. Thereby the front of the focusing lens barrel 26 is heavy because of the deadweight of the movable focus lens group 14, and the helicoid 27 is pushed to one side so that the inclined screw faces can contact each other. Moreover, the helicoids 27 can be prevented from loosening.

A lead is formed diagonal to an axis at the outer periphery of the focus fixing lens barrel 21. The lead is coupled to an interlocking pin 28 with a roller, which is provided in the focusing lens barrel 26. A guide hole is formed parallel to the axis at the outer periphery of the focus ring 30. The interlock pin 28 is engaged with the guide hole, and it is rotatable with regard to the focus fixing lens barrel 21. Accordingly, when the focus ring 30 rotates, the focusing lens barrel 26 is extended forward and backward by the helicoid 27, so that the focus can be adjusted. An air hole 26A is formed in the focusing lens barrel 26.

A focus gear 21, which rotates in association with the focus ring 30, connects to the back of the focus ring 30. A gear 33 is formed at the focus gear 32, and a drive gear of a drive unit (not shown) is engaged with the gear 33. A focus rotation stopper is provided at the rear end of the focus gear 32. When the stopper contacts a focus rotation stopper screw 36, which is secured to the outer periphery of the body fixing lens barrel 24 at intervals of approximately 145°, the rotation of the focus gear 32 is prevented. That is, the focus gear 32 rotates within a range of 145°, and the focus rotation stopper contacts the rotation stopper screw 36 so that the rotation outside the range can be controlled, and the unnecessary rotation can be prevented.

A rubber ring 37 is provided on the outer periphery of the focus ring 30, and on the outer periphery of the portion where the focus ring 30 connects to the focus gear 32. A non-slip suitable for manual operation is formed in the rubber ring 37.

The zooming section is constructed in such a manner that the first movable zoom lens group 16 and the second movable zoom lens group 18 are held by the zoom cum cylinder 40 of the body fixing lens barrel 24. The first movable zoom lens groups 16 and 18 are supported by supporting frames 42 and 44, respectively. Each of the supporting frames 42 and 44 is supported (in the body fixing lens barrel 24) in such a manner as to be movable forward and backward by means of a guide rod or a vertical groove formed in the body fixing lens barrel 24.

The zoom cam cylinder 40 is arranged in the body fixing lens barrel 24 in such a manner as to be rotatable. The zoom cam cylinder 40 connects to a zoom ring 48 via a pin 46. Accordingly, when the zoom ring 48 rotates, the zoom cam cylinder 40 also rotates in connection with the zoom ring 48. A gear 49 is formed in the zoom ring 48, and the gear 49 is engaged with a drive gear of the drive unit (not shown). A rubber ring 50 is provided on the outer periphery of the zoom ring. A non-slip suitable for manual operation is formed in the zoom ring 50. In the zoom cam cylinder 40, cam grooves 52 and 54 are formed (not described in detail in the drawing), and a pin 56 with a roller, which is provided at a supporting frame 42 supporting the first movable zoom lens group 16, is engaged with the front cam groove 52, so that the pin 56 of the supporting frame 42 can be guided into the cam groove 52. A pin 58 with a roller, which is provided at a lens supporting frame 44 supporting the second movable zoom lens 18, is engaged with the rear cam groove 54, so that the pin 58 of the supporting frame 44 can be guided into the cam groove 54. Thus, when the zoom cam cylinder 40 rotates, the first and second movable zoom lens group 16 and 18 move forward and backward, regulated by the cam grooves 52 and 54, so that the zooming can be adjusted.

The television lens 10 is constructed in such a manner that a fixed focus lens frame 20, which supports the fixed focus lens group 12, is attached to a different member (i.e., the focus fixing lens barrel 21) from a member (i.e., the body fixing lens barrel 24 and the focusing lens barrel 26) provided with the extending mechanism (the helicoid 27) for extending the movable focus lens group 14 forward and backward. The lens hood, the wide convertor lens, etc. are attached to the fixed focus lens frame 20.

FIGS. 1 and 2 illustrate the state that a cylindrical lens hood is attached to the outer periphery of the fixed focus lens frame 20. As depicted in FIG. 2, a hood mounting screw 64 is screwed from the outside in the direction of the diameter into the thick portion at a base edge 60A of the lens hood 60. The hood mounting screw 62 penetrates the base edge 60A of the lens hood 60, and a buffer member (e.g. plastic) 66 is attached to the bottom of the hood mounting screw 62. Accordingly, when the hood mounting screw 64 is screwed into the fixed focus lens frame 20 from the outside in the direction of the diameter, the bottom edge of the hood mounting screw 64 is engaged with a concave section 20B of the fixed focus lens frame 20 via the buffer member 66. The lens hood 60 is attached to the lens frame 20. Thus, it is well known that when the lens hood 60 is tightened by the hood mounting screw 64 in the direction of the diameter in order to be attached to the fixed focus lens frame 20, the fixed focus lens frame 20 changes in an order of 1/1000 mm (μm order).

Furthermore, a female screw 20C is formed at the inside of the point of the fixed focus lens frame 20 so that a wide convertor lens or a tele-convertor lens (not shown) can be attached to the fixed focus lens frame 20 via the female screw 20C. It is known that if the wide convertor lens (or the tele-convertor lens) is screwed into the female screw 20C, the fixed focus lens frame 20 is deformed in an order of 1/1000 mm (μm order).

Next, an explanation will be given about the operation of the preferred embodiments in accordance with the present invention which is constructed in the above-described manner.

The television lens 10 in FIGS. 1 and 2 are constructed in such a manner that the movable focus lens group 14 is held at the front of the focusing lens barrel 26, and a helicoid is formed at the back of the focusing lens barrel and is engaged with the helicoid 27 of the body fixing lens barrel 24. The center of gravity of the movable focus lens group 14 is away from the helicoid 27 in the direction of the optical axis 27. Accordingly, the helicoid of the focusing lens barrel 26 is pushed to one side, and it contacts the screw face of the helicoid formed in the body fixing lens barrel 24. Thereby, the inaccurateness of the focal point can be reduced, and the focusing can be satisfactorily performed.

The lens hood 60 is attached to the fixed focus lens frame 20 which is secured to the focus fixing lens barrel 21, which is different from the member (body fixing lens barrel 24) wherein the helicoid 27 is formed. Thereby, even if the fixed focus lens frame 20 changes its shape due to the force generated from the attachment, and the focus fixing lens barrel 21 is warped, the helicoid 27 is not warped.

Figure 4:
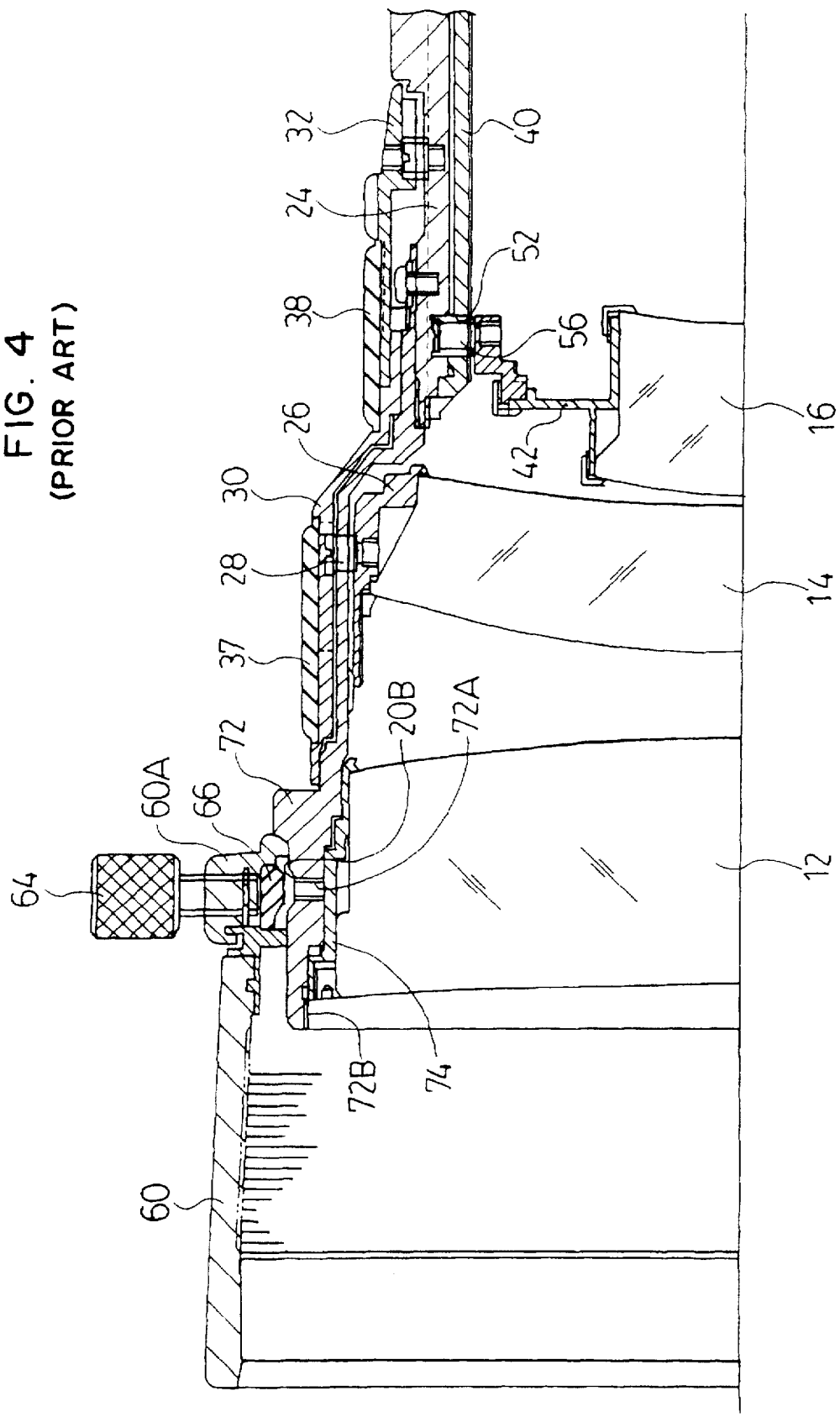
FIG. 4 is an enlarged view illustrating the essential parts of the conventional internal focusing zoom lens.

Only the front portion of the television lens 10 in FIG. 1 may be constructed as is the case in the conventional internal focusing zoom lens 70 in FIG. 4. That is, the front portion of the focus fixing lens barrel 21 may be formed long, and the fixed focus lens frame 20 may be secured to the inside of the focus fixing lens barrel 21 so that the lens hood 60 can be attached to the outer periphery of the focus fixing lens barrel 21. In this case, the focus fixing lens barrel 21 changes its shape due to the force generated by the attachment; however, the helicoid of the body fixing lens barrel 24 is not warped.

Thereby, the movable focus lens group 14 can be accurately positioned whether the lens hood 60 is attached or not, and the focusing can be precisely performed. Moreover, because the portion supporting the lens hood and the wide converter lens (or the tele-convertor lens) does not have to be strong, the zoom lens can be lightweight.

In this embodiment, the explanation is given about the warping caused by the attachment of the lens hood 60; however, the present invention is not restricted to this. It is known that the warping occurs when not only the lens hood but the tele-convertor lens or the wide convertor lens is attached to the point of the television lens. Such warping has an effect on the helicoid screw 27 of the body fixing lens barrel 21 and the focusing lens barrel 26 as is the case with the above-stated lens hood 60.

In this embodiment, the helicoid is employed as a mechanism for extending the movable focus lens group 14 forward and backward; however, a cam may be used instead of the helicoid.

As set forth hereinabove, in accordance with the internal focusing zoom lens of the present invention, at least one of the lens hood, the wide convertor lens and the tele-convertor lens is supported by the second fixing lens barrel, which is different from the first fixing lens barrel wherein the extending mechanism for extending the movable focusing lens group is formed. For this reason, the deformation caused by the attachment dose not warp the extending mechanism of the first fixing lens barrel. Thereby, the focusing can be accurately performed, and the zoom lens can be lightweight.

Furthermore, in accordance with the present invention, the center of gravity of the movable focus lens group is away from the position where the movable focus lens group is engaged with the extending means. For this reason, the extending mechanism and the engaged section provided in the focusing lens barrel are pushed to one side. Thereby, the inaccurateness of the focal point can be reduced, and the focusing can be accurately performed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An internal focusing zoom lens which performs focusing by extending, forward and backward, a movable focus lens group provided behind a fixed focus lens group, said internal focusing zoom lens comprising:

a first fixing lens barrel in which a helicoid is formed to extend said movable focus lens in the direction of the optical axis;

a focusing lens barrel supporting said movable focus lens group and connecting to said first fixing lens barrel in such a manner as to move forward and backward;

a second fixing lens barrel in which a fixed focus lens frame for supporting said fixed focus lens frame is fixed at a point thereof; and wherein when at least one of a lens hood, a wide convertor lens or a tele-convertor lens is attached to said second fixing lens barrel, said second fixing lens barrel is warped, but said helicoid of said first fixing lens barrel is not warped.

2. The internal focusing zoom lens as defined in claim 1, wherein said first fixing lens barrel and said second fixing lens barrel are connected to each other by a screw.

3. The internal focusing zoom lens as defined in claim 1, wherein said lens hood is attached such that an outer periphery of an attachment screw presses an outer periphery of said second fixing lens barrel or a fixed focus lens frame fixed to said second fixing lens barrel.

4. The internal focusing zoom lens as defined in claim 1, wherein a screw section is formed at an inner periphery at a front end of said fixing lens barrel, and said wide converter lens or tele-convertor lens is engaged with said second fixing lens barrel by said screw section.

5. An internal focusing zoom lens which performs focusing by extending, forward and backward, a movable focus lens group provided behind a fixed focus lens group, said internal focusing zoom lens comprising:

a first fixing lens barrel in which a helicoid is formed to extend said movable focus lens in the direction of the optical axis;

a focusing lens barrel which supports said movable focus lens group, and in which a helicoid engaged with said helicoid of said first fixing lens barrel, said focusing lens barrel connecting to said first fixing lens barrel in such a manner as to move forward and backward;

a second fixing lens barrel in which a fixed focus lens frame for supporting said fixed focus lens frame is fixed at a point thereof; and wherein when at least one of a lens hood, a wide convertor lens or a tele-convertor lens is attached to said second fixing lens barrel or said fixed focus lens frame fixed to said second fixing lens barrel, said second fixing lens barrel is warped, but said helicoid of said first fixing lens barrel is not warped.

6. The internal focusing zoom lens as defined in claim 5, wherein said first fixing lens barrel and said second fixing lens barrel are connected to each other by a screw.

7. The internal focusing zoom lens as defined in claim 5, wherein said lens hood is attached such that an attachment screw presses an outer periphery of said second fixing lens barrel or a fixed focus lens frame fixed to said second fixing lens barrel.

8. The internal focusing zoom lens as defined in claim 5, wherein a screw section is formed at an inner periphery of a front end of said second fixing lens barrel, and said wide convertor lens or tele-convertor lens is engaged with said second fixing lens barrel via said screw section.

9. The internal focusing zoom lens as defined in claim 5, wherein said fixed focus lens frame is connected to a tip of said second fixing lens barrel by a screw.

10. The internal focusing zoom lens as defined in claim 5, wherein said movable focus lens group is supported by said focusing lens barrel so that a center of gravity of said movable focus lens group is shiftable away from said helicoid in a direction of the optical axis, and said helicoid of said focusing lens barrel is pushed toward said helicoid of said fixing lens barrel so that the screw faces of said two helicoids contact each other, and thereby said helicoids are prevented from loosening.

11. An internal focusing zoom lens which extends a movable focus lens group provided behind a fixed focus lens group in a direction of an optical axis;

a fixing lens barrel provided with an extending mechanism for extending said movable focus lens group in the direction of said optical axis;

a focusing lens barrel supporting said movable focus lens group, having an engaged section engaged with said extending mechanism, and connecting to said fixing lens barrel in such a manner as to move forward and backward, said focusing lens barrel supporting said movable focus lens group so that a center of gravity of said movable focus group is shifted away from said engaged section in a direction of said optical axis; and wherein said extending mechanism and said engaged section are pushed to one side by said shifting of the center of gravity so that they contact each other in a manner eliminating looseness.

12. The internal focusing zoom lens as defined in claim 11, wherein said extending mechanism is a helicoid or a cam formed on the outer or inner periphery of said lens barrel.

* * * * *